United States Patent [19]  [11] 4,396,404
Engelman et al.  [45] Aug. 2, 1983

[54] FLOW CONTROL FOR OIL, GAS, WATER SEPARATION

[75] Inventors: Charles E. Engelman; Robert D. Anderson, both of Wichita Falls, Tex.

[73] Assignee: Engelman-General, Inc., Wichita Falls, Tex.

[21] Appl. No.: 286,889

[22] Filed: Jul. 27, 1981

[51] Int. Cl.³ .............................................. B01D 19/00
[52] U.S. Cl. ........................................ 55/42; 55/45; 55/174; 55/175
[58] Field of Search .............. 55/42, 45, 166, 174–176

[56] References Cited

U.S. PATENT DOCUMENTS

| | | | |
|---|---|---|---|
| 2,610,698 | 9/1952 | Lovelady et al. | 55/175 |
| 2,614,649 | 10/1952 | Walker et al. | 55/176 X |
| 2,726,729 | 12/1955 | Williams | 55/175 X |
| 3,202,167 | 5/1960 | De Young et al. | 55/166 X |
| 3,255,574 | 6/1966 | Glasgow | 55/176 X |
| 3,265,080 | 8/1966 | De Young et al. | 137/12 |
| 3,360,903 | 1/1968 | Meyer | 55/175 X |
| 3,389,536 | 6/1968 | Bull | 55/175 X |
| 3,432,991 | 3/1969 | Sauder et al. | 55/175 X |
| 4,012,207 | 3/1977 | Jones | 55/175 X |
| 4,329,159 | 5/1982 | Bull | 55/175 X |

Primary Examiner—Robert H. Spitzer
Attorney, Agent, or Firm—Richards, Harris & Medlock

[57] ABSTRACT

In separation of a stream of oil, gas and water into the constituents thereof in a horizontal heater-treater vessel having a gas separation chamber and an emulsion treating chamber, the stream is caused to flow downward into the gas separation chamber and through an outer secondary heating zone therein to permit gas to separate for upward flow and to cause heated components of the stream to turn to upward flow and thereafter to flow downward through an inner primary heating zone. Common boundaries of the heating zone are defined by an inverted U-shape shroud in the gas separation chamber. Water flows down to the bottom of the vessel from the stream in both the primary and secondary heating zone. Gas flows upward from both the primary and secondary heating zones and an oil-water emulsion flows from the primary heating zone directly into the emulsion treating chamber.

4 Claims, 3 Drawing Figures

U.S. Patent
Aug. 2, 1983
4,396,404
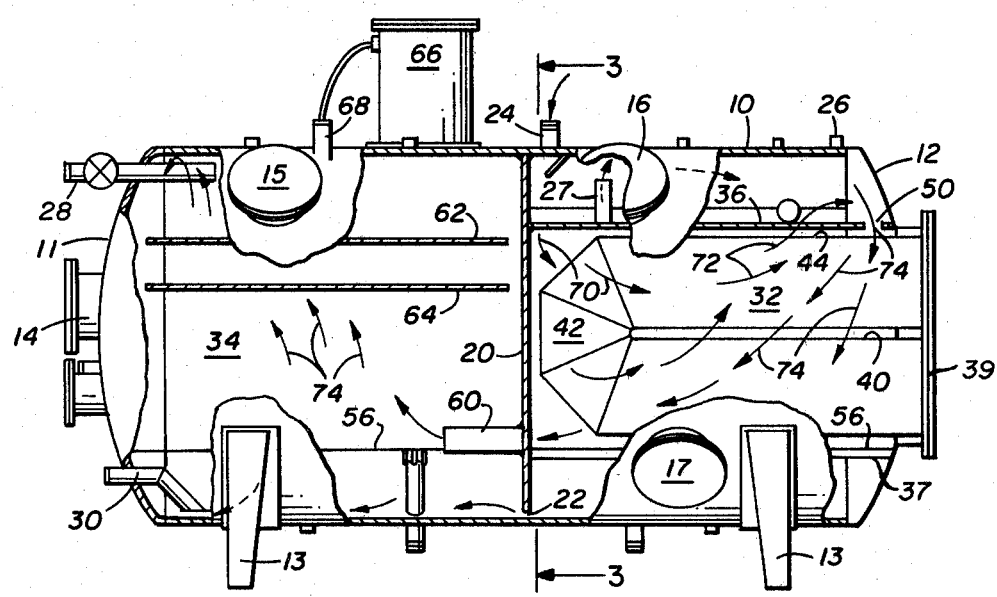
FIG. 1
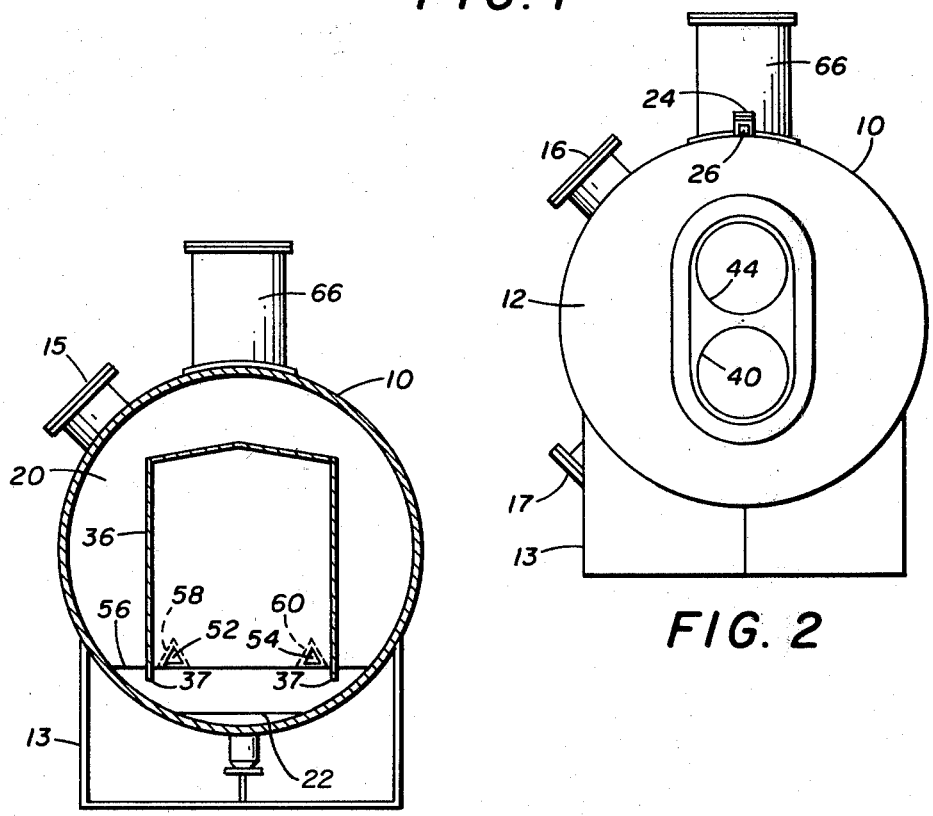
FIG. 2
FIG. 3

FLOW CONTROL FOR OIL, GAS, WATER SEPARATION

TECHNICAL FIELD

This invention relates to the treatment of liquid streams comprising oil, gas and water mixtures and is directed to an improved flow pattern and treating control for the separation of the mixture into its constituants.

BACKGROUND ART

This invention relates to a method and system for separating into its constituent parts liquid mixtures of oil, gas and water. Many heater-treater systems have heretofore been proposed. The present invention is directed generally to a type of heater such as disclosed in U.S. Pat. No. 3,432,991 wherein the gas separating chamber and an emulsion treating chamber are formed within a horizontal vessel. The gas separating chamber has a heat exchange structure to accelerate gas separation and the emulsion treating chamber utilizes high voltage electrostatic fields for coalescing water particles and causing them to drop out of the stream within the emulsion treating chamber.

DISCLOSURE OF THE INVENTION

The present invention relates to a new and useful structure employed in the gas separating chamber of a heater-treater and more particularly to the control of the flow patterns for maximizing the gas separation.

More particularly, there is provided in the gas separating chamber of a heater-treater with a heat exchange unit extending inside the chamber and arranged for contact with liquid flow passing thereover. A flow inlet port is provided near the center of the vessel and heads into the gas separating chamber with a gas outlet port at the opposite end and at the top of the gas separating chamber. An inverted U-shaped shroud is provided to overlay the heat exchange unit with the legs of the U-shaped shroud extending to near the bottom of the gas separating chamber. An opening for flow of fluid to the inside of the shroud is provided at the top of the U-shaped shroud in the region of the gas outlet. A gas outlet riser extends from the top of the shroud near the flow inlet port and extends to near the top of the gas separator chamber for upward flow of gas out of the shroud and thence to the gas outlet.

At least one port is provided for flow from the gas separating chamber at a level about the bottom edges of the legs of the shroud and at a point between the legs of the shroud. In such heater-treater free water falls to the bottom of the gas separating chamber, gas collects in the top of the gas separating chamber and it is extracted from the outlet port. The oil-water emulsion is then passed from the location inside the shroud from the gas separating chamber to an emulsion treating chamber.

BRIEF DESCRIPTION OF THE DRAWINGS

For more complete understanding of the invention, reference may now be had to the following description taken in conjunction with the accompanying drawings in which:

FIG. 1 is a longitudinal sectional view of a preferred embodiment of the invention;

FIG. 2 is an end view of the treater of FIG. 1; and

FIG. 3 is a sectional view taken along the lines 3—3 of FIG. 1.

DETAILED DESCRIPTION

Referring now to FIGS. 1 and 2, a treater 10 is provided in the form of an elongated cylinder having integral end caps 11 and 12. Treater 10 is supported by legs 13 and is provided with hatches 14, 15, 16 and 17 through which persons may enter for construction or maintenance activities. A central baffle 20 divides the vessel 10 into two distinct chambers 32 and 34, gas separation and emulsion treating chambers, respectively. Baffle 20 extends nearly to the bottom of vessel 10 leaving a bottom passageway 22 for flow from chamber 32 to chamber 34.

An oil-gas-water stream, such as from an oil field gathering system enters treater 10 by way of inlet 24. Gas is extracted by way of the gas outlet 26. Treated oil is extracted by way of outlet 28. Water is removed by way of water outlet 30.

In the gas separation chamber 32 is mounted an inverted U-shaped shroud 36. In FIG. 3, the U-shape of shroud 36 is clearly shown. Shroud 36 is secured liquid tight at its left end to the baffle 20. It is secured liquid tight at its right end to cap 12 and is open at bottom with the legs having bottom margins 37 located along the bottom of chamber 32.

A heater unit 39 extends through cap 12 and comprises an input tube 40 which leads to a U-turn structure 42 which in turn extends to an output tube 44. Heater 39 provides for rapidly heating fluids inside shroud 36 and more slowly heating fluids outside shroud 36. A gas flame not shown is directed into the tube 40 and serves to heat the walls of the elements 40, 42 and 44 and thus any liquid in contact with the same.

A riser 27 extends from the top of the U-shape shroud 36. It accommodates flow from within the shroud upward and out into the top of chamber 32.

Shroud 36 has an inlet 50 in the upper surface thereof near the right end adjacent to cap 12. Baffle 20 has a pair of ports 52 and 54 extending therethrough. As best shown in FIG. 3, the ports 52 and 54 are located inside shroud 36 and are of triangular shape with the base of the triangles being located at the lower margin of an water-oil interface 56 which becomes established inside shroud 36.

Overlying the openings 52 and 54 and extending into the chamber 34 are short inverted troughs one of which, the trough 60 is shown in FIG. 1. Trough 58 and 60 are indicated in dotted lines in FIG. 3.

Two electrical grids 62 and 64 are mounted in the upper portion of emulsion treating chamber 34. Grid 62, in accordance with known practices, is connected to ground or to the shell of treater 10. The lower grid 64 is supported from and below grid 62 by insulating means not shown. A transformer power supply unit 66 is mounted on top of treater 10 and supplies high voltage by way of a connector unit 68. The grids 62 and 64 are typically formed of expanded metal mesh and preferably are provided with structure to minimize high field gradients such as, for example, by rounding corners of the grid plates 62 and 64 and encompassing the edges in fairly large diameter tubing that forms a part of the grid.

In operation, the well stream of gas, oil and water enters the unit by way of the inlet 24. The heat tubes 40 and 44 are heated to a controlled temperature by a suitable flame (not shown). The cold incoming oil-gaswater mixture tends to flow downward as indicated at arrows 70. Free gas rises to the top of the unit in chamber 32. The mixture continues to flow downward along the sides of the shroud 36 and becomes heated by contact with the shroud itself. Thus, as it becomes heated, if becomes lighter and flows upward and over the top of the shroud as indicated by arrows 72. The fluid then enters inside the shroud by way of inlet 50 and travels downwardly across the heating elements as indicated by arrows 74.

In the course of the above movements, free water falls out of the mixture and collects in the bottom of the chamber 32 and is permitted to flow through passageway 22 toward the water outlet 30. As gas escapes from the fluid inside the shroud 36, it is permitted to pass upward through the riser 27 for extraction from the unit through the gas outlet 26.

The oil-water interface 56 becomes established with water below the interface and oil-water emulsion above the interface. The oil-water mixture then passes through ports 52 and 54 into coalescing chamber 34. The liquid flows from troughs 58 and 60 by passing around the lower edges of the troughs and then courses upwards, as indicated by arrows 74, through the grids where it is subject to a high voltage electric field between the grids. This causes the water particles to coalesce and then drop to the bottom for extraction through the water outlet. Water free oil then flows upward from the grids and is removed by way of the outlet 28.

The flow pattern established by structure in gas separation chamber 32 and in coalescing chamber 34 has been found to provide an optimum set of conditions for separation of oil, gas and water as produced from an oil well. The use of the shroud 36 in its control of the flow patterns involved significantly enhances the capability of the system to provide separation of the oil, water and gas from the stream entering the system.

Depending upon the magnitude of the flow, the units will be adjusted in size. For example, if the diameter of the treater 10 is of the order of 6 ft., then the diameter of the heating tubes 40 and 44 would be of the order of 1.5 ft. The unit, however, may be double that size in order to accommodate higher flow rates. In any event, the structure involving the control of the flow patterns as indicated in FIG. 1 will be maintained in order to produce the three distinct product streams.

Having described the invention in connection with certain specific embodiments thereof, it is to be understood that further modifications may now suggest themselves to those skilled in the art and it is intended to cover such modifications as fall within the scope of the appended claims.

What is claimed is:

1. In separation of a mixed stream of oil, gas and water into the constituents thereof in a horizontal heater-treater having a gas separation chamber and an emulsion treating chamber, the method comprising:
    (a) flowing said stream downward into one end of said gas separating chamber through an outer secondary heating zone therein to permit gas to separate for upward flow and to cause heated components of said stream to turn to upward flow and thereafter to flow downward through an inner primary heating zone;
    (b) collecting water from said stream upon fallout thereof down to the bottom of said vessel in both the primary and secondary heating zones to establish a water level common to both said chambers;
    (c) extracting gas flowing upward from both said primary and secondary heating zones, said gas being extracted from said gas separating chamber by way of a port remote from the stream flowing into said one end of said gas separating chamber;
    (d) flowing the oil-water emulsion from said primary heating zone directly into said emulsion treating chamber from within said primary heating zone by way of a path closed at about the level of the interface between said water and said oil-water emulsion;
    (e) extracting water in said emulsion treating chamber from below said level; and
    (f) extracting oil from the upper portion of said emulsion treating chamber at the end thereof remote from said gas separation chamber.

2. In an apparatus for separating oil, gas and water from a stream containing a mixture of the same wherein an elongated horizontal vessel is provided with a baffle extending transversely across the vessel, and secured in liquid-tight relation except that bottom edge thereof is spaced from the bottom wall of said vessel to define a limited opening for fluid flow between a gas separating chamber on one side of said baffle and an emulsion treating chamber on the other side of said baffle, the combination which comprises:
    (a) a closed heat exchange unit within said gas separating chamber;
    (b) an inlet structure at the top of said vessel in the region adjacent said baffle for a flow of said stream into said gas separating chamber;
    (c) a gas outlet structure at the top of said gas separating chamber remote from said baffle for flow of gas from said vessel;
    (d) an open bottom shroud extending between said baffle and the opposite end of said gas separating chamber with the shroud ends in liquid-tight relation and the shroud overlying said heat exchange unit in an inverted U-shape relation with the legs of said shroud extending downward to a region near the bottom of said gas separating chamber, said shroud having a flow port in the top thereof at the end of said shroud opposite said baffle;
    (e) structure defining a restricted opening through said baffle for flow from within said shroud at a level above the bottom said legs of said shroud and corresponding to about the oil-water interface between the liquids inside said shroud whereby the flow of said emulsion from said gas separating chamber to said emulsion treating chamber is of fluids at about said level;
    (f) a water outlet structure at the bottom of said vessel in the end of said emulsion treating chamber opposite said baffle; and
    (g) oil outlet structure at the top of said emulsion treating chamber and at the end thereof opposite said baffle.

3. The apparatus of claim 2 wherein the emulsion treating chamber includes electrically charged grids for producing a high voltage electric field for separating an oil and water mixture therein into oil and water.

4. The apparatus of claim 3 further including a trough connecting said opening through said baffle to said emulsion treating chamber for directing said oil and water mixture to said electrically charged grids, said trough being located within said emulsion treating chamber.

* * * * *

UNITED STATES PATENT AND TRADEMARK OFFICE
CERTIFICATE OF CORRECTION

PATENT NO. : 4,396,404

DATED : August 2, 1983

INVENTOR(S) : Engelman et al.

It is certified that error appears in the above—identified patent and that said Letters Patent is hereby corrected as shown below:

Column 1, line 52, change "about" to --above--.

Column 4, line 9, change "closed" to --located--.

Column 4, line 21, change "that" to --the--.

Signed and Sealed this

Sixth Day of December 1983

[SEAL]

Attest:

Attesting Officer

GERALD J. MOSSINGHOFF

Commissioner of Patents and Trademarks